United States Patent
Yabuta

[15] 3,663,067
[45] May 16, 1972

[54] VEHICULAR HYDRAULIC BRAKE SYSTEM

[72] Inventor: Keiichiro Yabuta, Yokohama, Japan

[73] Assignee: Nissan Motor Company, Limited, Yokohama, Japan

[22] Filed: Feb. 18, 1970

[21] Appl. No.: 12,280

[30] Foreign Application Priority Data

Feb. 22, 1969 Japan..................................44/12911

[52] U.S. Cl...........................303/6 C, 188/349, 303/84 A
[51] Int. Cl. .........................................................B60t 8/26
[58] Field of Search........................303/6 C, 84, 84 A, 22 A; 188/345, 349, 151 A

[56] References Cited

UNITED STATES PATENTS 3,467,440  9/1969  Strien....................................303/6 C Primary Examiner—Milton Buchler
Assistant Examiner—John J. McLaughlin
Attorney—McCarthy, Depaoli, O'Brien & Price

[57] ABSTRACT

A vehicular hydraulic brake system of tandem type having split master cylinders connected, for instance, to the front and rear brake units through independent fluid circuits, which system has a fluid pressure modulator valve constructed to transmit an unmodulated fluid pressure to the brake cylinder when a fluid pressure built up in the master cylinders is lower than a predetermined level and to transmit a modulated fluid pressure to the rear brake cylinders when the fluid pressure in the master cylinders exceeds the predetermined level, the modulated pressure being proportional to the input pressure from the rear brake master cylinder. In the event a failure takes place in the front brake fluid circuit, the valve transmits to the rear brake cylinders either an unmodulated fluid pressure or a pressure which is modulated to be higher than the fluid pressure modulated when the input fluid pressure is higher than the above mentioned predetermined level.

3 Claims, 5 Drawing Figures

VEHICULAR HYDRAULIC BRAKE SYSTEM

The invention relates to a vehicular hydralic brake system and, more particularly, to a brake system of tandem type having at least two split master cylinders connected through independent fluid circuits with brake cylinders of the wheel brake units.

It is sometimes experienced in driving a motor vehicle with a simple hydraulic brake system that failure of one component of the brake system makes the brakes inoperable. To reduce the risk of this occurring, it is proposed and put into practice to have the brake system divided into at least two independent fluid circuits, so that even in the event one circuit fails the other circuits are still left intact. The brake system having such two or more independent fluid circuits is called the split hydraulic brake system and a series of split master cylinders incorporated therein are called the tandem master cylinder or fluid motor. Where the brake system is divided into two independent fluid circuits with two associated master cylinders as is usually the case, one is connected with the front brakes and the other with the rears so that if the front brake circuit, for instance, fails the driver is still left with the rear brake circuit operable.

It is, apart from this, also encountered in driving a motor vehicle that the rear wheels are locked when the brake pedal is depressed hard so that the tires are skidded and the vehicle spinned. This is due to the fact that the weight transfer from the rear wheels increases with increasing deceleration. It is thus required to reduce the proportion of the braking effort exercised by the rear brakes as the deceleration increases. The braking effort is determined by the fluid pressure in the fluid lines to the brake cylinders and, for the purpose of reducing the braking effort by the rear brakes, it is necessary to interpose a fluid pressure regulator valve in the common fluid lines to the rear brake cylinders. One typical example of such pressure regulator valve is an inertia valve in which a ball rolls up an inclined ramp when the deceleration reaches a predetermined limit permitting a spring-loaded valve to close whereby the rear brake cylinders are isolated from the common master cylinder. Another example of the known regulator valve is a pressure-proportioning valve using a differential mechanism whereby, when further pressure is applied after the valve closes, some increase in pressure is transmitted to the rear brake cylinders although the larger proportion of the fluid pressure is carried to the front brake cylinders. A third representative example of the regulator valve is the one that is known as the pressure-limiting valve, in which, when the fluid pressure transmitted from the master cylinder reaches a pressure corresponding to a predetermined vehicle deceleration, a piston overcomes the force in a compression spring and closes ports leading to the rear brake cylinders; any further increase in pressure is then carried to the front brake cylinders.

If, now, it is desired for the sake of safety driving to have any of these prior art pressure regulator valves combined with the split hydraulic brake system, a problem arises in which only a reduced or limited fluid pressure is transmitted to the rear brake cylinders in the event of a failure in the fluid lines leading to the front brake cylinders.

When any of the fluid lines to the front brake cylinders fails for one reason or another, only the rear brakes are responsible for the braking, with the front brakes inoperable. Since, however, the fluid pressure to be carried to the rear brake cylinders has been reduced by the pressure regulator valve, the rear brakes receive a pressure which is determined merely for the purpose of preventing the rear wheels from being locked when the brake pedal is depressed hard. The braking effort exerted by the rear brakes is, as the consequence, insufficient for the desired deceleration of the vehicle, thus endangering the vehicle occupants.

An object of the invention is therefore to provide an improved hydraulic brake system of split type, in which, even though a failure has taken place in any of the fluid lines, the brakes of the remaining fluid lines still remain operable to exert sufficient braking effort thus saving the occupants from a danger of collision.

Another object is to provide an improved split type hydraulic brake system having a fluid pressure regulating or modulating valve whereby, in the event any brake becomes inoperable, the remaining brakes still remain operable to exert a braking effort required for the desired deceleration of the vehicle.

According to a first important feature of the invention to achieve these objects, the split brake system is provided with a fluid pressure modulator valve which is constructed in a manner to pass an unmodulated pressure to the associated brake cylinders when the pressure is lower than a predetermined level and to transmit a modulated or reduced fluid pressure to the brake cylinders when the pressure rises in excess of the predetermined level. When, moreover, a failure takes place in any of the fluid lines, then the valve functions to transmit an unmodulated fluid pressure to the brake cylinders associated with the remaining fluid lines, so that the brakes remaining operable can exert a sufficient braking effort.

According to a second important feature of the invention, the brake system is provided with a fluid pressure modulator valve which, if any of the fluid lines fails, transmits to the associated brake cylinders a fluid pressure modulated at an output-input ratio higher than that available when all the fluid lines are in sound state.

According to a third important feature of the invention, the brake system may be provided with a fluid pressure modulator valve which is constructed to respond not only to changes in the fluid pressure in the fluid lines but to a mechanical linkage movement resulting from an abrupt deceleration of the vehicle whereby the fluid communication between one master cylinder and the associated brake cylinders is blocked when the brake pedal is depressed hard.

Before entering into detailed description of the brake system according to the invention, it should be noted that the brake system is described and shown as divided into two independent fluid circuits connected respectively with front and rear brake units, although the same can be divided into more than two independent fluid circuits especially where the brake system is to be equipped on a motor vehicle having more than four driving wheels.

Figure 1:
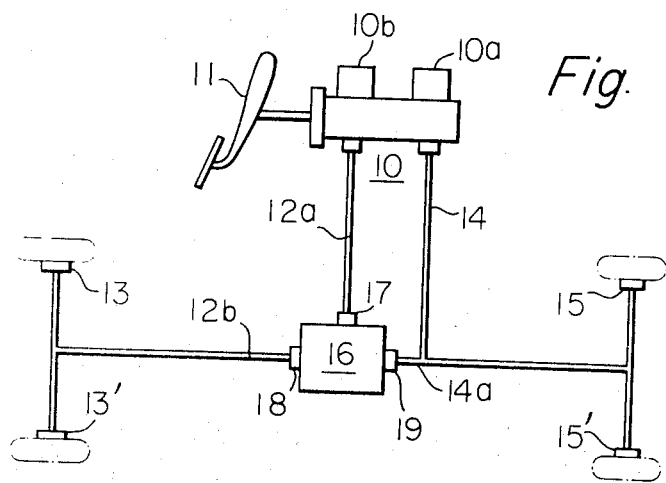
FIG. 1 is a schematic view showing a general arrangement of a hydraulic brake system of split type incorporating the fluid pressure modulator valve proposed by this invention.

Reference is now made to the accompanying drawings and particularly to FIG. 1. A brake system is illustrated which includes a fluid motor or master cylinder 10 of tandem type having separate front and rear sections 10a and 10b, respectively. The front and rear sections 10a and 10b are operated simultaneously by a brake pedal 11 to deliver brake fluid through fluid lines or conduits 12a and 12b to rear brake cylinders 13 and 13' and through a conduit 14 direct to front brake cylinders 15 and 15'. Between the conduits 12a and 12b is interposed a fluid pressure modulator valve 16 through an inlet port 17 and outlet port 18. According to a feature of the invention, the conduit 14 is branched to a branch conduit 14a which, in turn, is led to the modulator valve 16 through an inlet port 19. If preferred, the conduit 14 may be connected to the front brake cylinders 15 and 15' through the valve 16 without using the branch conduit 14a.

Figure 2:
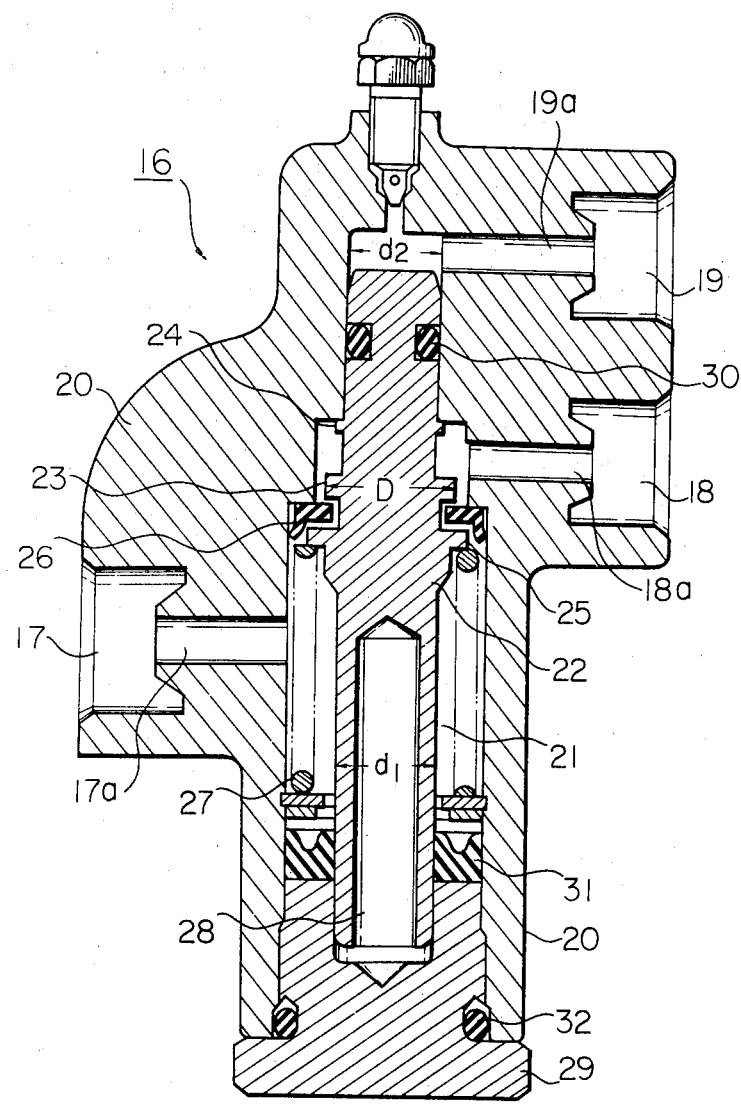
FIG. 2 is a sectional view showing a fluid modulator valve to be incorporated in the brake system according to the invention.

The detailed construction of a preferred example of the fluid pressure modulator valve 16 is illustrated in section in FIG. 2. As illustrated, the modulator valve 16 includes a cast metal housing 20 having formed therein a generally cylindrical bore or chamber 21. The chamber 21 communicates with the rear brake master cylinder 10b through a passage 17a to the inlet port 17 and with the rear brake cylinders 13 and 13' through a passage 18a to the outlet port 18, thus providing fluid communication between the ports 17 and 18. The chamber 21 also communicates with the front section 10a through a passage 19a to the inlet port 19.

The chamber 21 has accommodated therein means to modulate the pressure of the fluid flowing from the inlet port 17 to outlet port 18 responsive to changes in the fluid pressure occurring in the inlet port 19 from the front section. This means includes a generally cylindrical plunger 22 having a terminating end portion terminating at one end in the passage 19a. The plunger 22 has annular projections 23, 24 and 25. The annular projection 23 serves as a valve element working in cooperation with a lip seal 26 sealingly engageable with the wall of the chamber 21. The annular projection 24, on the other hand, is a stop to restrict the axial movement of the plunger 22, while the annular projection 25 holds a compression spring 27 in place. The compression spring 27 forces the plunger 22 to a position in which the annular projection or valve element 23 is unseated from the inner wall of the lip seal 26 so that the inlet port 17 is permitted to communicate with the outlet port and accordingly that fluid communication is provided between the rear brake master cylinder 10b and rear brake cylinders 13 and 13' (FIG. 1). The plunger 22 has a cavity 28 which is formed internally in its portion opposite to the end portion terminating in the passage 19a to the inlet port 19, which cavity is maintained at a substantially atmospheric pressure. The bore or chamber 21 is closed by a plug member 29 and is hermetically sealed off by means of rubber seals 30, 31 and 32 as shown.

When, now, the brake pedal is depressed with all the fluid circuits normally operable, and increased fluid pressure which may be represented by Pm occurs in the inlet ports 17 and 19 leading from the rear and front brake sections 10b and 10a, respectively. Until the pressure reaches a level which is predetermined by the compression of the spring 27 and the atmospheric pressure existing in the cavity 28 (which atmospheric pressure in turn is determined by the outside diameter $d_1$ of the hollow portion of the plunger 22), the plunger is held in its protruded position restricted by the stop 24 to cause the annular projection or valve element 23 to be unseated from the lip seal 26, permitting the fluid pressure in the inlet port 17 to be transmitted to the outlet port 18. If the pressure in the outlet port 18 is stood for by Pr, the pressure Pr in this condition is equal to the pressure Pm. The ratio of the output pressure in the outlet port 18 to the input pressure in the inlet port 17 is thus 1 vs. 1, as indicated by a solid line OA in the plot of FIG. 3.

As the brake is further depressed and the pressure Pm reaches a predetermined level at a predetermined point of transition which may be represented by Ps, then the plunger 22 is moved toward the plug member 29 against the action of the spring 27, whereby the annular projection or valve element 23 engages with the lip seal 26. The fluid communication between the inlet port 17 and outlet port 18 is blocked so that the pressure Pr in the outlet port 19 no longer rises irrespective of an increase in the pressure Pm.

When the pressure Pm increases in excess of the predetermined level Ps, then the plunger 22 is moved away from the plug member 29 due to the difference between the outside diameters $d_2$ of the terminating end of the plunger and D of the annular projection 23, so that the annular projection or valve element 23 leaves the lip seal 26. The fluid pressure Pr in the outlet port 18 now starts to rise.

When the pressure Pr thus increased for a second time reaches a level that is dictated by the outside diameters $d_1$, $d_2$ and D and the compression of the spring 27, then the plunger 22 is moved again toward the plug member 29, causing the valve element 23 to seat on the lip seal 26.

Figure 3:
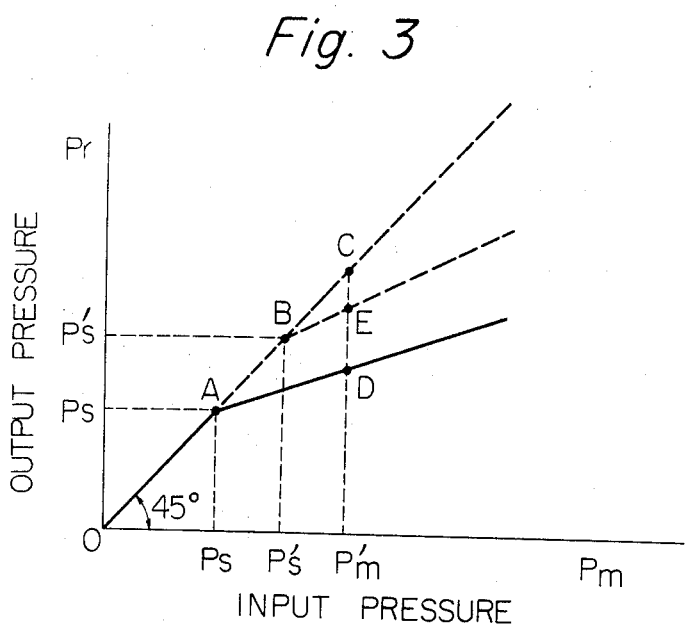
FIG. 3 is a graphical representation showing the relations between the input and output fluid pressure attainable in a known fluid pressure regulator valve and in the pressure modulator valve shown in FIG. 2.

The valve element 23 is, in this manner, seated and unseated repeatedly as the pressure Pm increases, with the result that the output pressure Pr occurring in the outlet port increases minutely stepwise at a rate lower than the increase of the pressure Pm, as indicated by a solid line AD in FIG. 3. The rear brake cylinders are thus supplied with fluid pressures that are modulated at a fixed ratio as the brake pedal is depressed deeper, so that the rear driving wheels are prevented from being locked.

As the brake pedal is released and the fluid pressure in the master cylinders reduced, the plunger 22 is moved by the pressure in the outlet port 18 toward the plug member 29 and at the same time the fluid in the outlet port 18 is drawn back to the inlet port 17 through a passage now formed between the lip seal 26 and inner wall of the chamber 21 until the pressure in the outlet port 18 lowers to Ps. If it happens that the hollow portion of the plunger 22 hits the plug member 29 before the pressure Pr decreases to Ps, the fluid in the outlet port 18 is passed to the inlet port 17 through the passage formed between the lip seal 26 and the wall of the chamber 21. As the consequence, the pressure Pr is lowered to Ps.

In the event a failure or break takes place in the fluid circuit to the front brake unit, then the pressure in the inlet port 19 will reach an atmospheric pressure. If, in this instance, the outside diameter $d_2$ is equal to or larger than the outside diameter $d_1$, the plunger 22 is maintained in its protruded position irrespective of the pressure Pm of the fluid in the master cylinders 10a and 10b, keeping the inlet port 17 to communicate with the outlet port 18. The pressure modulator valve 16 under this condition no longer acts as a valve in its usual sense but as a mere passageway to pass the brake fluid freely from the inlet port 17 to the outlet port 18. The relation between the input and output pressures Pm and Pr, respectively, in this state of the valve 16 is indicated by a dotted line ABC in FIG. 3.

Thus, according to one embodiment of the present invention, the modulator valve 16 becomes inoperative in the event of a failure in, for instance, the front brake fluid circuit so that the fluid pressure occurring in the rear brake master cylinder 10b is transmitted as it is to the rear brake cylinders 13 and 13'. If, for instance, a fluid pressure of Pm' occurs in the rear brake master cylinder 10b, then an output pressure that is higher by CD than the pressure that would otherwise occur in the outlet port 18 can be transmitted to the rear brake cylinders 13 and 13', thus adding to the braking effort by the rear brakes.

The ratio of the output pressure to the input pressure available when the front fluid circuit fails can be modulated by varying the geometry of the plunger 22. If, for instance, the diameter $d_1$ is made larger than the diameter $d_2$, the modulator valve will be actuated when the pressure Pm exceeds Ps' which is larger than Ps in such a manner that the output pressure Pr is reduced to BE in FIG. 3. In this instance, an output pressure higher by ED than the normal pressure is applied to the rear brakes when the input pressure Pm' is transmitted to the inlet port 17.

Should a failure be involved in the fluid circuit to the rear brake units, on the other hand, only the fluid pressure in the inlet port 19 increases. As the pressure in the inlet port 19 exceeds a predetermined level, the plunger 22 moves toward the plug member 29 until the hollow portion of the plunger contacts the plug member. The plunger 22 is thus maintained at rest and an unmodulated pressure is carried to the front brake cylinders 15 and 15'.

Figure 4:
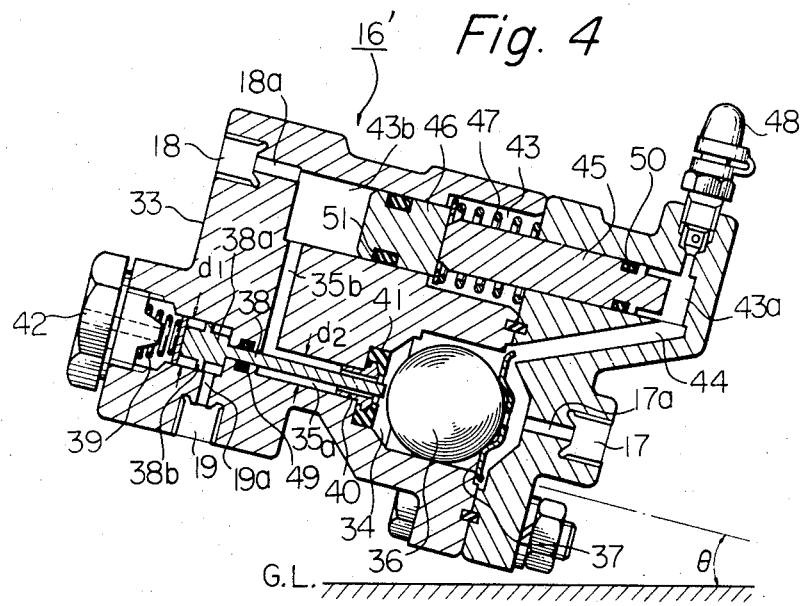
FIG. 4 is a view similar to FIG. 2 but showing a modification of the pressure modulator valve.

A modified form of the fluid pressure modulator valve usable in the hydraulic brake system of the invention is illustrated in FIG. 4. The modified pressure modulator valve, which is now generally represented by numeral 16', is constructed essentially as an inertia valve which is mentioned at the outset of the description.

As illustrated, the fluid pressure modulator valve 16' includes a housing 33 of cast metal. The housing 33 has formed therein a bore or chamber 34 communicating with an inlet port 17 through a passage 17a and with an outlet port 18 through passages 35a, 35b and 18a. The inlet and outlet ports 17 and 18 communicate with the rear brake master cylinder 10b and rear brake cylinders 13 and 13', respectively, similar to the valve 16 shown in FIG. 2. In the bore or chamber 34 is accommodated a ball member 36 which is supported by a receiver plate 37 secured to the housing 33. The ball member 36 rests on a ramp which forms part of the wall of the chamber 34 and which is inclined at an angle of $\theta$ to the horizontal or ground line G.L. A control element 38 is provided behind the passage 19a from an inlet port 19 communicating with the front brake master cylinder 10a. The control element 38 on one hand extends axially movably into the passage 35a and has on the other an enlarged portion 38a acting as a stop to restrict the axial movement of the control element 38 toward the chamber 34. The control element 38 is moved back and forth by the fluid pressure applied to an annular projection 38b formed on the enlarged portion 38a. The control element 38 is normally forced into its protruded position by the compression of a compression spring 39 mounted behind the enlarged portion 38a of the control element 38, whereby the leading end of the control element 38 projects into the chamber 34 as illustrated. At the inlet to the passage 35a are mounted an orifice 40 to regulate the flow of fluid therethrough and a ball seal member 41 which is lined on the wall of the chamber 34. The chamber to accommodate the spring 39 is hermetically isolated from the chamber to accommodate the enlarged portion 38a of the control element 38 and is opened into the air through an air vent 42.

The compression of the spring 39 and the relative outside diameter $d_1$ of the annular projection 38 are so determined that the spring 39 overpowers a fluid pressure applied to the enlarged portion 38a when the pressure is lower than a predetermined level.

The housing 33 also has formed therein a second bore or chamber 43 which communicates with the first chamber 34 through a chamber 43a and a passage 44 and with the outlet port 18 through a chamber 43b and passage 18a. The chambers 43a and 43b form part of the chamber 43.

The chamber 43 has accommodated therein two separate pistons 45 and 46 which are held in contact with each other by the pressures of the fluids. One piston 45 is exposed to a fluid transmitted from the rear brake master cylinder 10b through the passage 44 and chamber 43a, and the other piston 46 to a fluid staying in the chamber 43b. The piston 46 is forced toward the chamber 43b by the action of a compression spring 47 mounted in the chamber 43. The piston 45 is herein shown as smaller in diameter than the piston 46.

In order that air entrapped in the fluid in the passages 35b and 44 be allowed into the atmosphere, air bleeds may be provided anywhere therein, although only an air bleed 48 is herein illustrated. Designated by numerals 49 to 51 are rubber seals.

Figure 5:
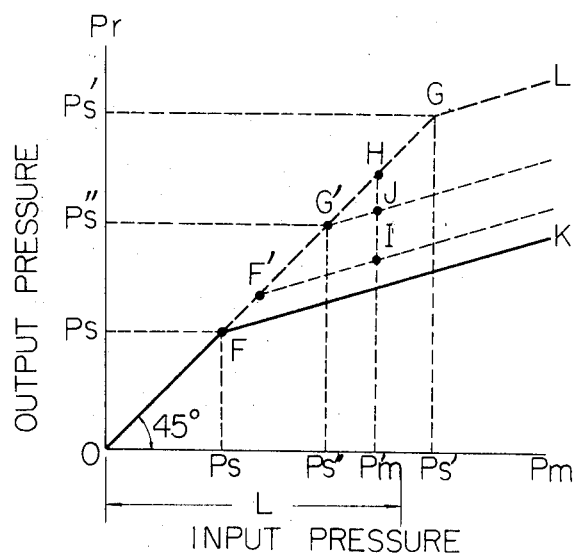
FIG. 5 is similar to FIG. 3 but shows the relations between the input and output fluid pressures attainable in a known regulator valve and the modulator valve shown in FIG. 4.

When, now, the brake pedal is depressed with the fluid circuits all normally operable and with the control element 38 held in a position to have its leading end projecting into the chamber 34, the passage 35a is kept open to permit the fluid pressure in the chamber 43 to be transmitted to the outlet port 18 directly. As a result, the pressure to be carried to the rear brake cylinders increase as indicated by a solid line AF in FIG. 5.

As the brake pedal is further depressed and the fluid pressure $Pm$ applied to the control element 38 through the inlet port 19 is increased to a level that is slightly lower than a predetermined fluid pressure $Ps$, the control element 38 is moved against the action of the spring 39 and the leading end thereof is withdrawn from the chamber 34. Once the fluid pressure $Pm$ reaches $Ps$ and the deceleration increases accordingly, then the ball member 36 rolls up the inclined ramp or wall of the chamber 34 and is brought into contact with the ball seat 41 due to a force of inertia, isolating the passage 35a from the chamber 34. As the consequence, the input pressure $Pm$ occurring in the chamber 34 is transmitted to the piston 45 through the passage 44 and chamber 43a.

When the fluid pressure $Pm$ rises in excess of $Ps$, then the output pressure occurring in the outlet port 18 increases at a rate which is dictated by the outside diameters of the pistons 45 and 46 and the compression of the spring 47, as indicated by a solid line FK. Thus, a constantly reduced fluid pressure is transmitted to the rear brake cylinders to prevent the rear driving wheels from being locked objectionably.

If, in an existing inertia valve which is void of the control element 38 and its associated parts, a failure takes place in the fluid circuit to the front brake unit so that only the rear brake fluid circuit is left operable, the actuating point of the inertia valve is shifted from the point F to a point F' whereby the output pressure $Pr$ to be carried to the rear brake cylinders is increased as indicated by a dotted line F'I. The output pressure thus reduced is apparently insufficient for the proper operation of the rear brakes, creating a danger to the vehicle occupants.

In the modified fluid pressure modulator valve 16', in contrast, the control element 38 is freed of the fluid pressure as soon as the front brake fluid circuit fails and, thereafter, the leading end of the control element 38 remains projecting into the chamber 34 past the ball seat 41. If, therefore, the compression of the spring 39, diameter $d_2$ of the leading end of the control element 38 and weight of the ball member 36 are properly determined, a fluid pressure $Ps'$ at which the ball member 36 is moved to close the passage 35a may be determined at a point outside a certain pressure range (which is indicated by L in FIG. 5) so that the valve 16' as a whole can act merely as a passageway when the input pressure $Pm$ remains within this particular range. In this instance, the output pressure to be transmitted to the rear brake cylinders will increase as indicated by a dotted line FG and, if an input pressure $Pm'$ falling within the range L is transmitted to the inlet port 17, the braking effort by the rear brakes will increase by an amount corresponding to a segment HI in FIG. 5 as compared with a conventional inertia valve.

If, furthermore, the compression of the spring 39, diameter $d_2$ of the leading end of the control element 38, weight of the ball member 36 are determined otherwise, the ball member 36 may be moved when the fluid pressure reaches $Ps''$ which falls within the range L. The output pressure, in this instance, will increase as indicated by a dotted lines FG'J with an increment of HJ at the input pressure $Pm'$.

In any event, the output pressure to be exerted to the rear brake cylinders after the passage 35a is closed by the ball member 36 increases at one and the same rate that is governed by the diameters of the pistons 45 and 46 and the compression of the spring 47, as previously discussed.

What is claimed is:

1. In a vehicular hydraulic brake system comprising a tandem master cylinder having front and rear sections respectively connected through two independent fluid circuits with front and rear brake cylinders for respectively effecting braking in front and rear wheels of a vehicle, a fluid pressure modulator valve provided intermediately of one of said fluid circuits, comprising: a first inlet port communicating with one of the front and rear sections and with one of the brake cylinders for providing constant fluid communication therebetween; a second inlet port communicating with the other of the front and rear sections; an outlet port communicating with the other of said brake cylinders; a chamber for providing fluid communication between said second inlet port and said outlet port to pass an unmodulated fluid pressure from said second inlet port to said outlet port when a fluid pressure prevailing in said first inlet port is lowered than a predetermined level at a predetermined point of transition; and means responsive to normal changes in said fluid pressure for transmitting a modulated pressure from said second inlet port to said outlet port when said fluid pressure increases beyond said predetermined level and to a failure in said one of the fluid circuits for increasing said modulated pressure, said means comprising a generally cylindrical plunger axially slidably accommodated in said chamber and having an annular projection on its middle peripheral wall, a terminating end portion terminating in a passage communicating with said first inlet port and a hollow end portion internally maintained at an atmospheric pressure, a lip seal sealingly engageable with the wall of said chamber and with said annular projection, and a compression spring mounted in said chamber for urging said plunger to a position in which said annular projection is unseated from said lip seal for permitting said second inlet port to communicate with said outlet port, the compression of said spring being determined to overcome said fluid pressure being applied to said plunger when said fluid pressure is lower than said predetermined level and to surrender to said fluid pressure when said pressure is higher than said predetermined level, and the outside diameters of two end portions of said plunger and of said annular projection being determined to cause said annular projection to be repeatedly seated and unseated as the fluid pressure prevailing in said first and second inlet ports increases relative to the fluid pressure prevailing in said outlet port.

2. A fluid pressure modulator valve according to claim 1, wherein the outer diameter of said terminating end portion is at least equal to the outer diameter of said hollow end portion, whereby said means transmits an unmodulated fluid pressure from said second inlet port to said outlet port.

3. A fluid pressure modulator according to claim 1, wherein the outer diameter of said terminating end portion is less than the outer diameter of said hollow end portion, whereby said means shifts said predetermined point of transition to a higher pressure side in terms of said fluid and transmits from said second inlet port to said outlet port a fluid pressure that is modulated to be higher than said modulated pressure.

* * * * *